(12) United States Patent  
Chu et al.

(10) Patent No.: US 8,824,029 B2  
(45) Date of Patent: Sep. 2, 2014

(54) COLOR CALIBRATION METHOD AND IMAGE PROCESSING DEVICE USING THE SAME

(75) Inventors: Po-Nian Chu, New Taipei (TW); Chih-Jung Chang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 112 days.

(21) Appl. No.: 13/615,605

(22) Filed: Sep. 14, 2012

(65) Prior Publication Data

US 2013/0003146 A1    Jan. 3, 2013

(30) Foreign Application Priority Data

Aug. 15, 2012  (TW) .................................. 101129559

(51) Int. Cl.
- *H04N 1/46* (2006.01)
- *G03F 3/08* (2006.01)
- *G06K 9/00* (2006.01)
- *G01D 18/00* (2006.01)

(52) U.S. Cl.
CPC ...................................... *H04N 1/46* (2013.01)
USPC ............. 358/504; 358/518; 382/167; 702/85

(58) Field of Classification Search
None
See application file for complete search history.

(56) References Cited

U.S. PATENT DOCUMENTS

| | | | |
|---|---|---|---|
| 5,185,673 A | 2/1993 | Sobol | |
| 5,271,096 A | 12/1993 | Cook | |
| 5,510,896 A | 4/1996 | Wafler | |
| 6,044,180 A * | 3/2000 | Brandestini et al. | 382/274 |
| 6,445,317 B2 * | 9/2002 | Lundin et al. | 341/120 |
| 6,597,473 B1 | 7/2003 | Rasmussen et al. | |
| 6,809,837 B1 * | 10/2004 | Mestha et al. | 358/1.9 |
| 7,110,142 B2 * | 9/2006 | Mestha et al. | 358/1.9 |
| 7,181,088 B2 | 2/2007 | Lin | |
| 7,319,547 B2 * | 1/2008 | Piatt et al. | 358/1.9 |
| 7,417,769 B2 * | 8/2008 | Hasler et al. | 358/2.1 |
| 8,212,874 B2 * | 7/2012 | Zeng et al. | 348/148 |

(Continued)

FOREIGN PATENT DOCUMENTS

EP    1104161    5/2001

OTHER PUBLICATIONS

Shih-Sen Hsieh, U.S. Appl. No. 13/207,437, filed Aug. 11, 2011, pp. 1-41.

(Continued)

*Primary Examiner* — Madelein A Nguyen
(74) *Attorney, Agent, or Firm* — Jianq Chyun IP Office

(57) ABSTRACT

A color calibration method and an image processing device using the same are provided. The method includes: obtaining a first image of a calibration card having color blocks, each of which corresponds to a standard value; obtaining first sensing values according to the first image, wherein each of the first sensing values corresponds to one of the standard values; generating a calibration table according to the first sensing values and the standard values; determining if a recursive condition is satisfied. The method also includes: obtaining a second image of the calibration card if the recursive condition is not satisfied; obtaining second sensing values according to the second image; adjusting the second sensing values according to the calibration table to generate third sensing values; updating the calibration table according to the third sensing values and the standard values until the recursive condition is satisfied. Accordingly, the calibration table is generated automatically.

10 Claims, 10 Drawing Sheets

(56) References Cited

U.S. PATENT DOCUMENTS

| | | | |
|---|---|---|---|
| 8,467,453 B2* | 6/2013 | Wu et al. | 375/240.16 |
| 2001/0010500 A1* | 8/2001 | Lundin et al. | 341/120 |
| 2002/0084414 A1* | 7/2002 | Baker et al. | 250/336.1 |
| 2003/0025067 A1* | 2/2003 | Tsai et al. | 250/208.2 |
| 2003/0025925 A1* | 2/2003 | Elsman et al. | 358/1.9 |
| 2003/0053154 A1 | 3/2003 | Kamisuwa | |
| 2003/0086103 A1* | 5/2003 | Mestha et al. | 358/1.9 |
| 2004/0239964 A1* | 12/2004 | Dalal et al. | 358/1.9 |
| 2004/0263919 A1 | 12/2004 | Aoyama | |
| 2005/0275724 A1 | 12/2005 | Albertelli | |
| 2007/0103742 A1* | 5/2007 | Ernandes et al. | 358/504 |
| 2007/0211154 A1* | 9/2007 | Mahmoud et al. | 348/251 |
| 2008/0151307 A1 | 6/2008 | Minamida et al. | |
| 2010/0157380 A1 | 6/2010 | Miyagawa | |
| 2010/0329343 A1* | 12/2010 | Wu et al. | 375/240.16 |
| 2011/0096165 A1* | 4/2011 | Zeng et al. | 348/148 |
| 2011/0115666 A1* | 5/2011 | Feigin et al. | 342/22 |
| 2011/0188781 A1* | 8/2011 | Gu | 382/295 |
| 2012/0299573 A1* | 11/2012 | Vangool et al. | 323/358 |

OTHER PUBLICATIONS

"Search Repost of European Counterpart Application", issued on Mar. 27, 2012, p. 1-p. 8.

* cited by examiner

| Color block | Standard value | Sensing value |
|---|---|---|
| 310(1) | 0 | 2 |
| 310(2) | 11 | 4 |
| 310(3) | 22 | 5 |
| ⋮ | ⋮ | ⋮ |
| 310(A) | 255 | 204 |

| Index | output value |
|---|---|
| 0 | |
| 1 | |
| 2 | 0 |
| 3 | |
| 4 | 11 |
| 5 | 22 |
| ⋮ | ⋮ |
| 204 | 255 |
| 205 | |
| ⋮ | ⋮ |
| 255 | |

| Index | output value |
|---|---|
| 0 | 0 |
| 1 | 0 |
| 2 | 0 |
| 3 | 6 |
| 4 | 11 |
| 5 | 22 |
| ⋮ | ⋮ |
| 204 | 255 |
| 205 | 255 |
| ⋮ | ⋮ |
| 255 | 255 |

| Color block | Standard value | Second sensing value | Adjusted second sensing value (third sensing value) |
|---|---|---|---|
| 310(1) | 0 | 0 | 0 |
| 310(2) | 11 | 3 | 6 |
| 310(3) | 22 | 5 | 22 |
| ⋮ | ⋮ | ⋮ | ⋮ |
| 310(A) | 255 | 204 | 255 |

FIG. 6

| Index | output value |
|---|---|
| 0 | 0 |
| 1 | |
| 2 | |
| 3 | |
| 4 | |
| 5 | |
| 6 | 11 |
| ⋮ | ⋮ |
| 22 | 22 |
| ⋮ | ⋮ |
| 255 | 255 |

| | Index | output value | |
|---|---|---|---|
| 720(0) | 0 | 0 | 710(0) |
| 720(1) | 1 | 2 | 710(1) |
| 720(2) | 2 | 4 | 710(2) |
| 720(3) | 3 | 5 | 710(3) |
| 720(4) | 4 | 7 | 710(4) |
| 720(5) | 5 | 9 | 710(5) |
| 720(6) | 6 | 11 | 710(6) |
| | ⋮ | ⋮ | |
| 720(11) | 11 | 14 | 710(11) |
| | ⋮ | ⋮ | |
| 720(22) | 22 | 22 | 710(22) |
| | ⋮ | ⋮ | |
| 720(255) | 255 | 255 | 710(255) |

| Index | output value | |
|---|---|---|
| 420(0) — 0 | 0 | — 410(0) |
| 420(1) — 1 | 0 | — 410(1) |
| 420(2) — 2 | 0 | — 410(2) |
| 420(3) — 3 | 11 | — 410(3) |
| 420(4) — 4 | 14 | — 410(4) |
| ⋮ | ⋮ | |
| 420(255) — 255 | 255 | — 410(255) |

COLOR CALIBRATION METHOD AND IMAGE PROCESSING DEVICE USING THE SAME

CROSS-REFERENCE TO RELATED APPLICATION

This application claims the priority benefit of Taiwan application serial no. 101129559, filed on Aug. 15, 2012. The entirety of the above-mentioned patent application is hereby incorporated by reference herein and made a part of this specification.

BACKGROUND OF THE INVENTION

1. Field of the Invention

The invention relates to a color calibration method and an image processing device using the same.

2. Background of the Invention

Generally, when a scanner captures an image of an object, the actual luminance of the object may not be the same as the luminance of the object in the captured image. There may be nonlinear distortion between the actual luminance of the object and the luminance of the object in the captured image, and the distortion may be expressed by formula (1) below.

$$Y \propto X^{\gamma} \quad (1)$$

Here, X denotes the actual luminance of the object, Y denotes the luminance of the object in the image, and $\gamma$ is a parameter. Due to the nonlinear distortion that occurs at the time of capturing the image, the scanner may perform gamma correction on luminance or chrominance of an image after capturing the image, so as to remove the nonlinear distortion. The gamma correction refers to nonlinear compensation of an error in the image, such that the luminance of the object may have a linear relationship with the luminance of the corrected image. Gamma correction may be expressed by formula (2) below.

$$Y' \propto Y^{1/\gamma} \quad (2)$$

Here, Y' denotes the luminance after gamma correction, and $\gamma$ is a parameter that is applied during gamma correction. After a calculation is made according to the formula (2), Y' may have a linear relationship with X.

To accomplish the gamma correction, an analog method or a digital method is often applied. In the analog method, a nonlinear electronic circuit is employed to generate a result that is similar to the calculation result of the formula (2).

In the digital method, an exponential calculation is directly made according to the formula (2). However, the exponential calculation may not be instantaneously performed on certain devices, and therefore pre-calculated input and output results may be stored in a lookup table. When the gamma correction is to be performed, the adjusted luminance may be obtained by looking up the lookup table.

It is rather efficient to merely apply one $\gamma$ to different scanners, whereas the numerical value of one $\gamma$ may not be applicable to all of the scanners. If $\gamma$ corresponding to each scanner is manually generated, a significant amount of time will be required. Therefore, how to automatically generate $\gamma$ draws attention of researchers in the pertinent field.

SUMMARY OF THE INVENTION

An embodiment of the invention is directed to a color calibration method and an image processing device for automatically generating a calibration table.

In an embodiment of the invention, a color calibration method for an image processing device is provided. The color calibration method includes: obtaining a first image of a calibration card, wherein the calibration card has a plurality of color blocks, and each of the color blocks corresponds to a standard value; obtaining a plurality of first sensing values according to the first image, wherein each of the first sensing values corresponds to one of the standard values; generating a calibration table according to the first sensing values and the standard values; determining if a recursive condition is satisfied. The color calibration method also includes: obtaining a second image of the calibration card if the recursive condition is not satisfied, obtaining a plurality of second sensing values according to the second image, adjusting the second sensing values according to the calibration table to generate a plurality of third sensing values, and updating the calibration table according to the third sensing values and the standard values until the recursive condition is satisfied.

From another perspective, in an embodiment of the invention, an image processing device that includes an image capturing unit and a processor is provided. The image capturing unit is configured for obtaining a first image of a calibration card. The calibration card includes a plurality of color blocks, and each of the color blocks corresponds to a standard value. The processor is coupled to the image capturing unit for obtaining a plurality of first sensing values according to the first image, and each of the first sensing values corresponds to one of the standard values. Here, wherein the processor is configured to generate a calibration table according to the first sensing values and the standard values and determine if a recursive condition is satisfied. If the recursive condition is not satisfied, the processor is also configured to obtain a second image of the calibration card, obtain a plurality of second sensing values according to the second image, adjust the second sensing values according to the calibration table to generate a plurality of third sensing values, and update the calibration table according to the third sensing values and the standard values until the recursive condition is satisfied.

In light of the foregoing, the color calibration method and the image processing device described in the embodiments of the invention are provided for automatically generating a calibration table and updating the calibration table in a recursive manner.

Several exemplary embodiments accompanied with figures are described in detail below to further explain the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 4 and FIG. 5 are schematic diagrams of establishing a calibration table according to an embodiment of the invention.

FIG. 6 to FIG. 9 are schematic diagrams of updating a calibration table according to an embodiment of the invention.

DETAILED DESCRIPTION OF DISCLOSED EXEMPLARY EMBODIMENTS

First Embodiment

Figure 1:
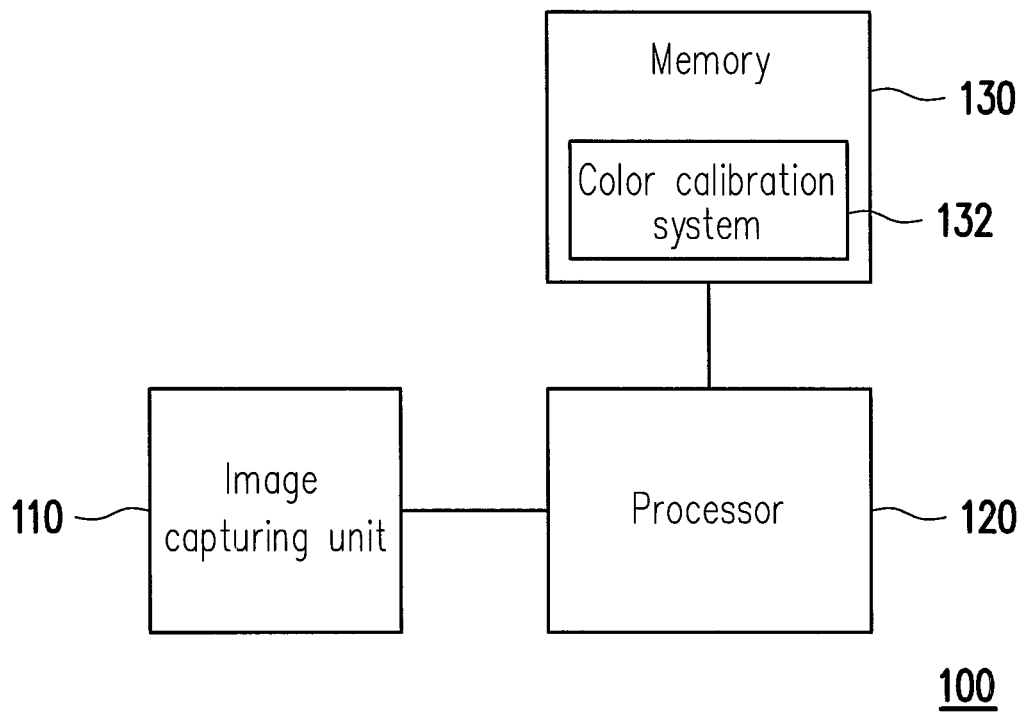
FIG. 1 is a block diagram illustrating an image processing apparatus according to an embodiment of the invention.

FIG. 1 is a block diagram illustrating an image processing apparatus according to an embodiment of the invention.

With reference to FIG. 1, the image processing device 100 includes an image capturing unit 110, a processor 120, and a memory 130. For instance, the image processing device 100 may be implemented in form of a scanner, a digital camera, a digital camcorder, a computer, or a server.

The image capturing unit 110 serves to obtain one or a plurality of images. For instance, the image capturing unit 110 includes a lens and a plurality of photosensitive devices. Charges on one photosensitive device form one color value, and one or more color values may constitute one pixel. However, in another embodiment of the invention, the image capturing unit 110 may be implemented in form of a communication interface for obtaining images from other devices, which should not be construed as a limitation to the invention.

The processor 120 serves to execute one or more program codes to correct color values in one image. For instance, the processor 120 may be a central processing unit (CPU) or an embedded microcontroller.

The memory 130 serves to store a program code or an image. In the present embodiment, the memory 130 stores a color calibration system 132. The color calibration system 132 includes a plurality of modules, each of which achieves a specific function. The processor 120 executes each of the modules in the color calibration system 132.

Figure 2:
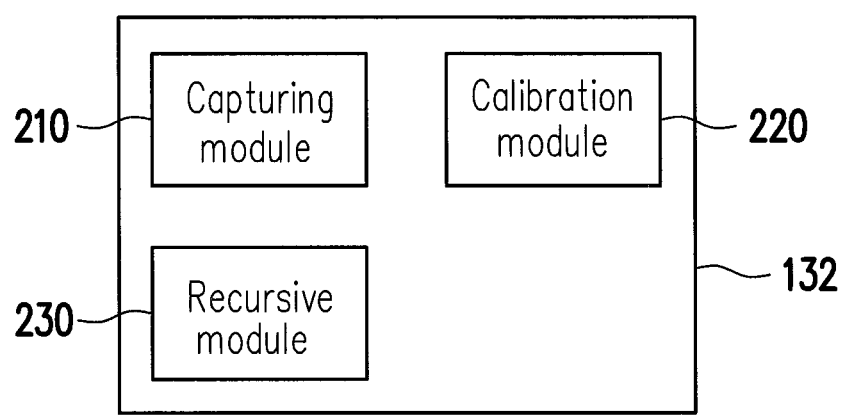
FIG. 2 is a schematic diagram illustrating a color calibration system according to an embodiment of the invention.

FIG. 2 is a schematic diagram illustrating a color calibration system according to an embodiment of the invention.

With reference to FIG. 2, the color calibration system 132 includes a capturing module 210, a calibration module 220, and a recursive module 230.

The processor 120 executes the capturing module 210, so as to control the image capturing unit 110 and obtain one or more images. Besides, the processor 120 executes the calibration module 220 to generate a calibration table according to the image obtained by the processor 120. The processor 120 further executes the recursive module to determine if a recursive condition is satisfied. If the recursive condition is not satisfied, the processor 120 continues to obtain another image through the capturing module 210 and updates the calibration table according to the image through the calibration module 220. Here, the operations of the capturing module 210, the calibration module 220, and the recursive module 230 are performed by the processor 120 and will not be further described hereinafter.

Figures 3A, 3B:
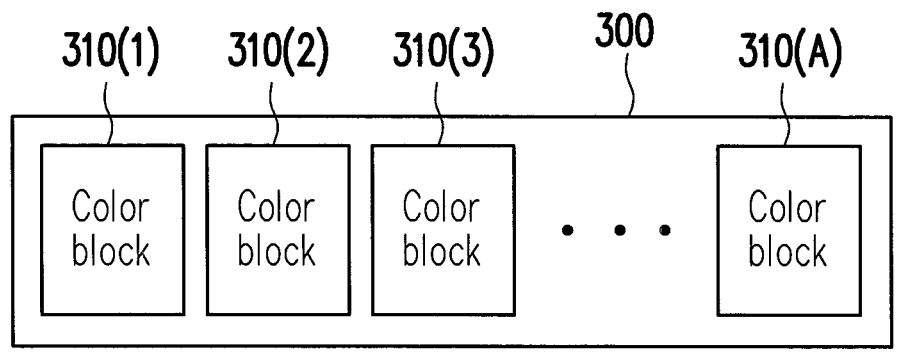
FIG. 3A and FIG. 3B are schematic diagrams illustrating a calibration card according to an embodiment of the invention.

FIG. 3A and FIG. 3B are schematic diagrams illustrating a calibration card according to an embodiment of the invention.

With reference to FIG. 3A and FIG. 3B, the calibration card 300 includes a plurality of color blocks 310(1) to 310(A). The color in one of the color blocks 310(1) to 310(A) remains unchanged, and each of the color blocks 310(1) to 310(A) corresponds to a standard value. For instance, the color block 310(1) corresponds to the standard value "0", the color block 310(2) corresponds to the standard value "11", and so on. The calibration card 300 serves to provide the standard color blocks 310(1) to 310(A), such that the image processing device 100 may generate the calibration table according to the color blocks 310(1) to 310(A) and the corresponding standard values.

In the present embodiment, each standard value represents a numerical value of luminance. However, in another embodiment, each standard value may represent a numerical value of chrominance (e.g., red, green, or blue). Alternatively, each block may correspond to another standard value, which should not be construed as a limitation to the invention.

To generate the calibration table, the capturing module 210 obtains an image from the calibration card 300 and obtains a plurality of sensing values (also referred to as "first sensing values") according to the image. For instance, the capturing module 210 obtains color values of pixels in a region of the image corresponding to the color block 310(1). The capturing module 210 calculates an average of the color values and considers the average color value as the sensing value "2" of the corresponding color block 310(1). Similarly, the capturing module 210 obtains color values of pixels in a region of the image corresponding to the color block 310(2), calculates the average of the color values, and considers the average color value as the sensing value "4" of the corresponding color block 310(2). The rest may be analogically deduced from the above.

Nonetheless, due to some hardware errors or noises, the sensing value and the standard value corresponding to the same color block may not be the same. For instance, both the sensing value "2" and the standard value "0" correspond to the same color block 310(1), while there is a difference of 2 between the two values; both the sensing value "4" and the standard value "11" correspond to the same color block 310(2), while there is a difference of 7 between the two values. The calibration module 220 may generate the calibration table according to the sensing values and the standard values shown in FIG. 3B.

Figure 4:
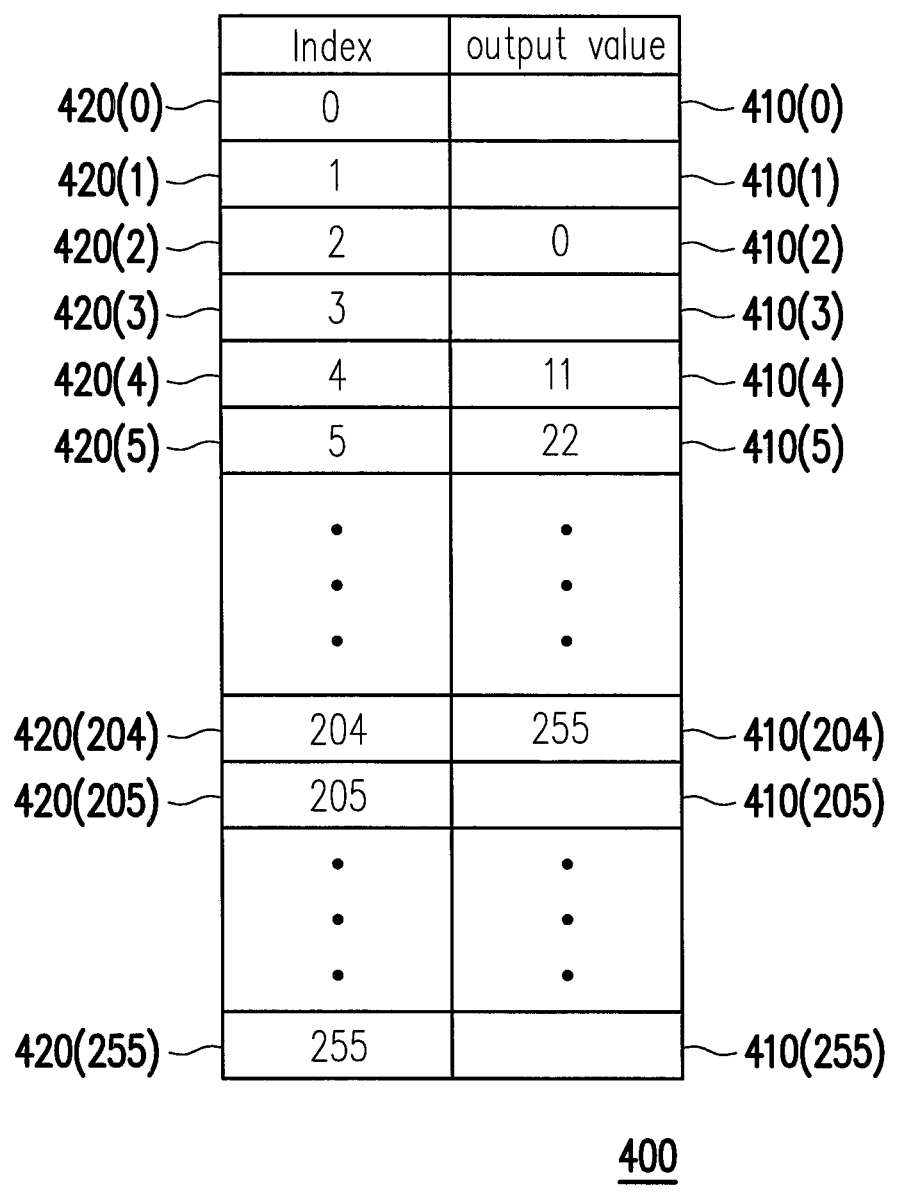

FIG. 4 and FIG. 5 are schematic diagrams of establishing a calibration table according to an embodiment of the invention.

With reference to FIG. 4, the calibration table 400 includes a plurality of output values 410(0) to 410(255), and each of the output values 410(0) to 410(255) respectively corresponds to one of the indexes 420(0) to 420(255). When a numerical value is input, the calibration module 220 considers the numeral value as an index of the calibration table 400 and outputs a corresponding output value. For instance, if the input numerical value is "2", the input numerical value is considered as the index 420(2), and the corresponding output value 410(2) is then output.

When the calibration table 400 is established, the calibration module 220 sets part of the indexes 420(0) to 420(255) as the sensing values shown in FIG. 3B and sets some of the output values 410(0) to 410(255) corresponding to the sensing values as the standard values. For instance, the standard value "0" corresponds to the sensing value "2"; therefore, the calibration module 220 sets the index 420(2) as the sensing value "2" and sets the output value 410(2) as the standard value "0". The standard value "11" corresponds to the sensing value "4"; therefore, the calibration module 220 sets the index 420(4) as the sensing value "4" and sets the output value 410(4) corresponding to the sensing value "4" as the standard value "11". The standard value "22" corresponds to the sensing value "5"; therefore, the calibration module 220 sets the index 420(5) as the sensing value "5" and sets the output value 410(5) as the standard value "22". In the present embodiment, there are 24 standard values, and therefore there are only 24 output values (e.g., the output values 410(2), 410(4), 410(5), and 410(204)) are set as the corresponding standard values.

The calibration module 220 also generates the output values that do not correspond to the sensing values. Specifically, the calibration module 220 obtains the minimum sensing value (i.e., the sensing value "2") and the maximum sensing value (i.e., the sensing value "204") from the sensing values. Besides, the calibration module 220 sets the output values 410(0) and 410(1) corresponding to the indexes 420(0) and 420(1) less than the minimum sensing value as a first preset value. The calibration module 220 also sets the output values 410(205) to 410(255) corresponding to the indexes 420(205) to 420(255) greater than the maximum sensing value as a second preset value. Moreover, the calibration module 220 generates the rest of output values (e.g., the output value 410(3)) through an interpolation algorithm.

With reference to FIG. 5, the calibration module 220 sets the first preset value as 0 and the second preset value as 255. That is, the output values 410(0) and 410(1) are setd as "0", and the output values 410(205) to 410(255) are setd as "255". According the output values 410(2) and 410(4), the calibration module 220 generates the output value 410(3) through an interpolation algorithm. For instance, the calibration module 220 calculates an average of the output values 410(2) and 410(4) to generate the output value 410(3).

However, in another embodiment of the invention, the calibration module 220 may perform the interpolation algorithm through a low-pass filter. Alternatively, the calibration module 220 may generate an exponential function or a polynomial function according to the output values 410(2), 410(4), 410(5), 410(204), and so on. According to the generated function, the calibration module 220 may calculate the output value 410(3), which should not be construed as a limitation to the invention. In addition, when a color value of a pixel is represented by more number of bits (i.e., greater than 8 bits), the calibration table 400 may include more indexes and more output values, and the first preset value and the second preset value may be configured as different numerical values, which should not be construed as a limitation to the invention.

After the calibration table 400 is generated, the recursive module 230 determines if a recursive condition is satisfied. If the recursive condition is satisfied, the calibration module 220 outputs the calibration table 400. Thereafter, when the capturing module 210 obtains an image, the calibration module 220 may adjust the color values of pixels in the image according to the calibration table 400. However, if the recursive condition is not satisfied, the calibration module 220 continues to update the calibration table 400 until the recursive condition is satisfied.

In process of updating the calibration table 400, the capturing module 210 obtains another image (i.e., the second image) from the calibration card 300 and obtains a plurality of sensing values (also referred to as "second sensing values") according to the image. The calibration module 220 adjusts the second sensing values according to the current calibration table 400, so as to generate a plurality of sensing values (also referred to as "third sensing values"). Based on the standard values and the third sensing values, the calibration module 220 updates the calibration table 400 until the recursive module 230 determines that the recursive condition is satisfied.

FIG. 6 to FIG. 9 are schematic diagrams of updating a calibration table according to an embodiment of the invention.

With reference to FIG. 6, the second sensing values which are obtained by the capturing module 210 and correspond to the color blocks 310(1) to 310(3) and 310(A) are "0", "3", "5", . . . , and "204". The calibration module 220 adjusts the second sensing values according to the calibration table 400, so as to generate the third sensing values "0", "6", "22", . . . , and "255". For instance, the calibration module 220 considers "3" as the index of the calibration table 400 to generate the output value "6", and the calibration module 220 considers "5" as the index of the calibration table 400 to generate the output value "22". Note that the capturing module 210 may not be able to obtain the same sensing values corresponding to the same color block at different times. For instance, the capturing module 210 obtains the sensing value "4" (as shown in FIG. 3B) corresponding to the color block 310(2) at the first time but obtains the sensing value "3" corresponding to the same color block 310(2) at the second time.

The calibration module 220 may establish a temporary calibration table according to the aforesaid process of establishing the calibration table 400. In particular, the calibration module 220 sets some of the indexes in the temporary calibration table as the third sensing values, sets the output values corresponding to the third sensing values as the standard values, and generates the output values not corresponding to the third sensing values.

Figure 7:
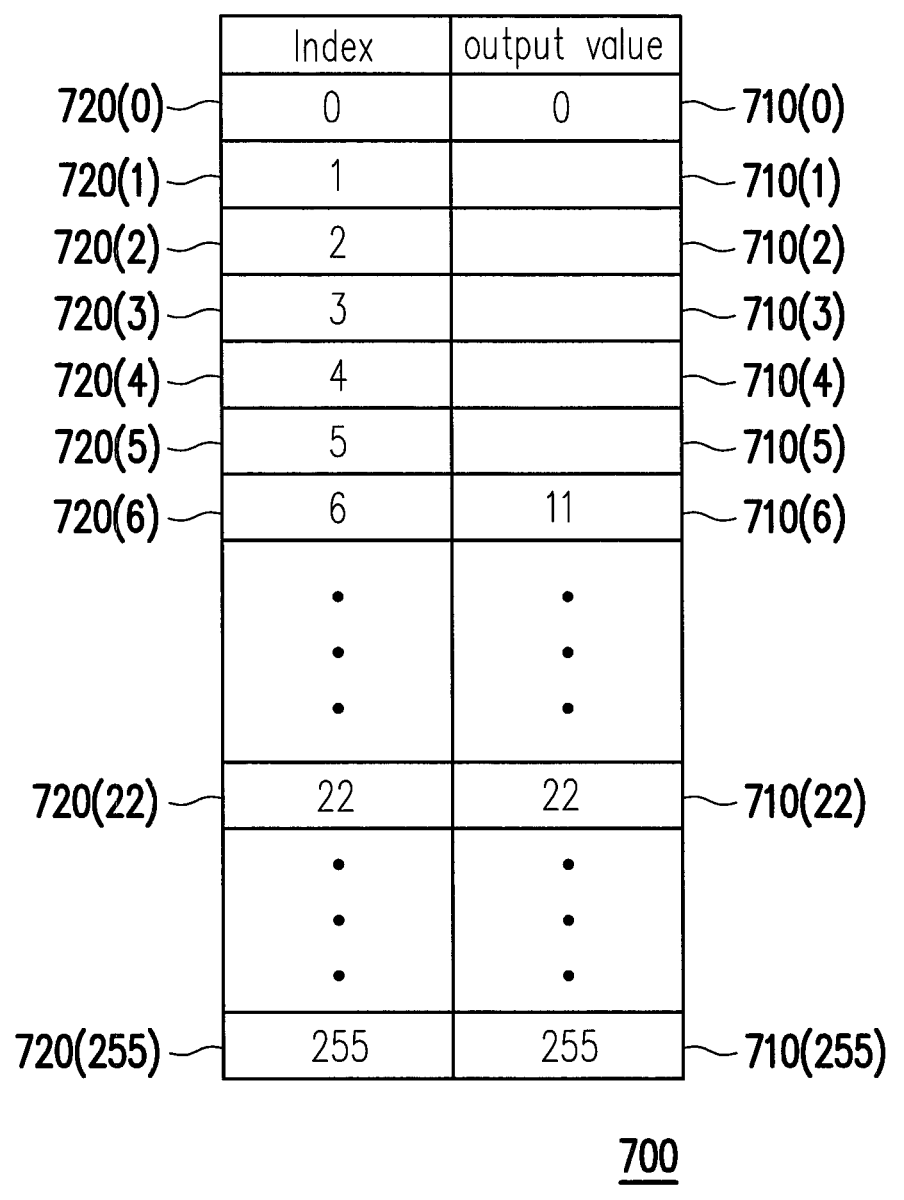

With reference to FIG. 7, the temporary calibration table 700 includes a plurality of output values 710(0) to 710(255), and each of the output values 710(0) to 710(255) respectively corresponds to one of the indexes 720(0) to 720(255). The calibration module 220 sets the indexes 720(0), 720(6), and 720(22) as the third sensing values "0", "6", "22", and "255". The output values 710(0), 710(6), 710(22), and 710(255) are correspondingly set as the standard values "0", "11", "22", and "255".

With reference to FIG. 8, the calibration module 220 calculates the output values 710(1) to 710(5) and 710(11) not corresponding to the third sensing values according to an interpolation algorithm. For instance, the calibration module 220 generates the output value 710(11) (i.e. numerical value "14") through the linear interpolation.

The calibration module 220 combines the temporary calibration table 700 with the calibration table 400, so as to update the calibration table 400. In particular, if the calibration table 400 includes a second index, and the second index corresponds to a second output value in the calibration table 400, the calibration module 220 takes the second output value as the index of the temporary calibration table 700, so as to obtain a fourth output value in the temporary calibration table 700. The calibration module 220 then replaces the second output value with the fourth output value. For instance, as shown in FIG. 4 and FIG. 8, the index 420(4) corresponds to the output value 410(4) (i.e. numerical value "11"). The calibration module 220 takes "11" as the index 720(11) of the temporary calibration table 700 and obtains the output value 710(11) (i.e. numerical value "14"). The calibration module 220 then sets the output value 410(4) as the output value 710(11), as shown in FIG. 9.

From another perspective, the calibration table 400 and the temporary calibration table 700 may be represented by the following formulas (3) and (4).

$$M_n = \{m_{n,0}, m_{n,1}, \ldots, g_{n,255}\} \quad (3)$$

$$G_n = \{g_{n,0}, g_{n,1}, \ldots, g_{n,255}\} \quad (4)$$

Here, $M_n$ represents the calibration table 400 when the calibration table 400 is updated for the $n^{th}$ time, and n is a positive integer. $m_{n,0}$ represents the $0^{th}$ output value 410(0) in the calibration table 400 when the calibration table 400 is updated for the $n^{th}$ time, and the rest may be analogically deduced from the above. $G_n$ represents the temporary calibration table 700 generated when the calibration table 400 is updated for the $n^{th}$ time, $g_{n,0}$ represents the $0^{th}$ output value 710(0) when the calibration table 400 is updated for the $n^{th}$ time, and the rest may be analogically deduced from the above. The step of combining the calibration table 400 with the temporary calibration table 700 may be represented by the following formulas (5) to (7).

$$M_{n+1} = \{m_{n+1,0}, m_{n+1,1}, \ldots, m_{n+1,255}\} \quad (5)$$

$$m_{n+1,j} = g_{n,t} \quad (6)$$

$$t = m_{n,j} \quad (7)$$

That is, the $j^{th}$ output value $m_{n,j}$ in the calibration table 400 when the calibration table 400 is updated for the $n^{th}$ time may be taken as the index t. The calibration module 220 may, according to the index t, find the output value $g_{n,t}$ of the temporary calibration table 700. The output value $g_{n,t}$ may be considered as the $j^{th}$ output value $m_{n+1,j}$ in the calibration table 400 when the calibration table 400 is updated for the $(n+1)^{th}$ time.

The step of updating the calibration table 400 is repeated until the recursive module 230 determines that the recursive condition is satisfied. In an embodiment of the invention, the recursive module 230 determines if a recursive number matches a recursive threshold value; if yes, the recursive module 230 determines that the recursive condition is satisfied. The recursive number is updated as long as the calibration table 400 is updated. For instance, the default recursive number is 0, the recursive number is increased by 1 as long as the calibration table 400 is updated, and the recursive threshold value is 3. When the recursive number is greater than or equal to 3, the recursive module 230 determines that the recursive number matches the recursive threshold value. That is, as long as the calibration table 300 is updated three times, the recursive condition is deemed satisfied. However, in another embodiment, the default recursive number is 3, the recursive number is decreased by 1 as long as the calibration table 400 is updated, and the recursive threshold value is 0. As long as the recursive number is smaller than or equal to 0, the recursive module 230 determines that the recursive number matches the recursive threshold value. Note that the recursive threshold value may be set as 5, 10, and so on, which should not be construed as a limitation to the invention.

According to an embodiment of the invention, after the calibration table 400 is generated or updated, the recursive module 230 calculates a difference between the sensing values and the standard values. If the difference is less than a difference threshold, the recursive module 230 determines that the recursive condition is satisfied. For instance, the recursive module 230 calculates the difference according to the following formula (8):

$$R_n = \sum_{j=1}^{k} (i_{n,j} - s_j)^2 \quad (8)$$

Here, $R_n$ represents the difference when the calibration table 400 is updated for the $n^{th}$ time, j and k are integers, k represents the number of color blocks in the calibration card 300, $i_{n,j}$ represents the sensing value corresponding to the $j^{th}$ color block when the calibration table 400 is updated for the $n^{th}$ time, and $S_j$ represents the standard value corresponding to the $j^{th}$ color block. It should be mentioned that $i_{1,j}$ is not adjusted according to the calibration table in process of calculating $R_1$ (i.e., $i_{1,j}$ is the first sensing value). In process of calculating $R_2$, $i_{2,j}$ is adjusted according to the calibration table $M_1$ (i.e., $i_{2,j}$ is the third sensing value rather than the second sensing value). After the calibration table $M_n$ is generated, the recursive module 230 performs the calculation and determines if the difference $R_n$ is less than a difference threshold. If the difference $R_n$ is less than the difference threshold, the recursive module 230 determines that the recursive condition is satisfied and outputs the calibration table $M_n$.

The sum of squared error is calculated by applying the formula (8). However, in other embodiments of the invention, the difference may also be calculated by the recursive module 230 through calculating a mean squared error or a sum of absolute error, which should not be construed as a limitation to the invention.

In the present embodiment, the recursive module 230 determines that the recursive condition is satisfied when the difference is less than the difference threshold or when the recursive number matches the recursive threshold value. However, in other embodiments, the recursive module 230 may determine that the recursive condition is satisfied when the difference is less than the difference threshold and when the recursive number matches the recursive threshold value.

Figure 10:
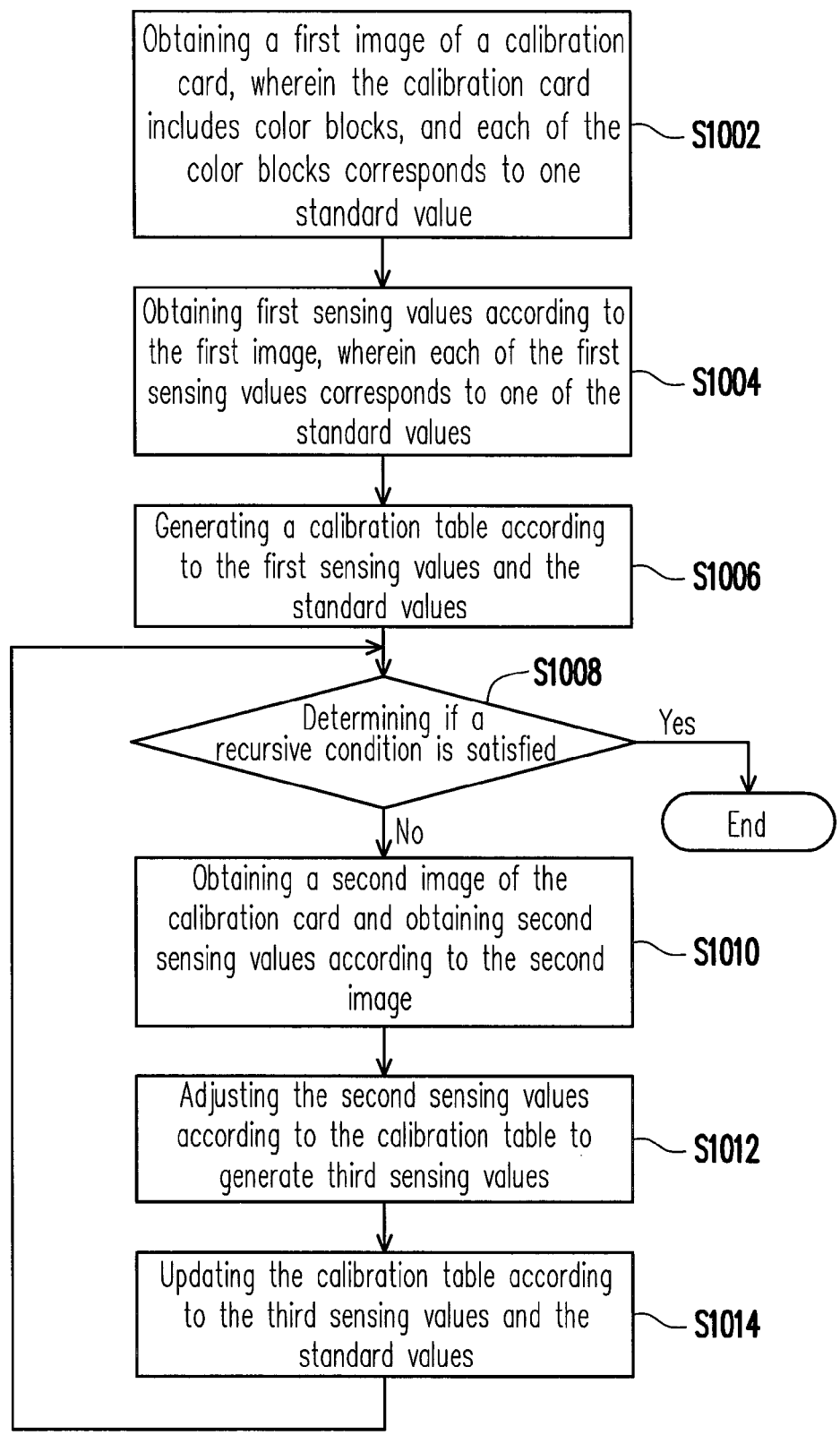
FIG. 10 is a flowchart illustrating a color calibration method according to an embodiment of the invention.

FIG. 10 is a flowchart illustrating a color calibration method according to an embodiment of the invention.

With reference to FIG. 10, in step S1002, a capturing module 210 obtains a first image of a calibration card. The calibration card includes a plurality of color blocks, and each of the color blocks corresponds to a standard value.

In step S1004, the capturing module 210 obtains a plurality of first sensing values according to the first image, and each of the first sensing values corresponds to one of the standard values.

In step S1006, the calibration module 220 generates a calibration table according to the first sensing values and the standard values.

In step S1008, the recursive module 230 determines if a recursive condition is satisfied. If yes, said process is completed.

If the recursive condition is not satisfied, in step S1010, the capturing module 210 obtains a second image of the calibration card and obtains a plurality of second sensing values according to the second image. In step S1012, the calibration module 220 adjusts the second sensing values according to the calibration table, so as to generate a plurality of third sensing values. In step S1014, the calibration module 220 updates the calibration table according to the third sensing values and the standard values.

Each step shown in FIG. 10 is already elaborated above and thus will not be further explained hereinafter.

Second Embodiment

The second embodiment is similar to the first embodiment, and thus only the difference between these two exemplary embodiments is described herein. According to the first embodiment, when the capturing module 210 obtains the sensing values at the first time, the calibration module 220 does not adjust the sensing values according to the calibration table. By contrast, according to the second embodiment, as long as the capturing module 210 obtains the sensing values, the calibration module 220 adjusts the sensing values according to the calibration table.

Figure 11:
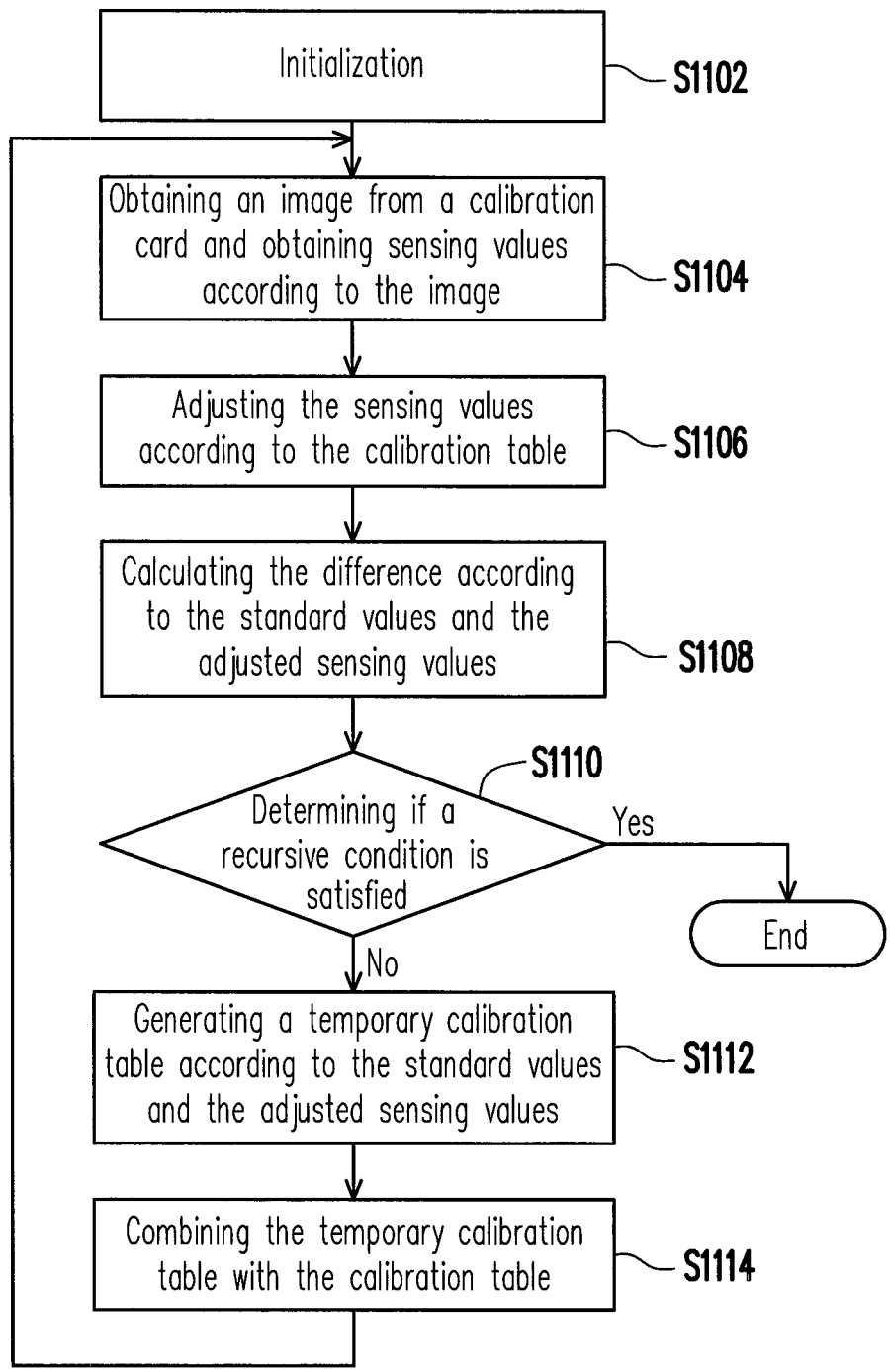
FIG. 11 is a flowchart illustrating a color calibration method according to a second embodiment of the invention.

FIG. 11 is a flowchart illustrating a color calibration method according to a second embodiment of the invention.

With reference to FIG. 11, in step S1102, the calibration module 220 and the recursive module 230 execute an initialization program. The calibration module 220 sets a default calibration table, and each output value in the default calibration table is equal to the corresponding index. That is, in the second embodiment, $m_{1,i}$ shown in the formula (3) is equal to i. The recursive module 230 also sets a recursive threshold value and a difference threshold.

In step S1104, the capturing module 210 obtains an image from the calibration card 300 and obtains a plurality of sensing values according to the image.

In step S1106, the calibration module 220 adjusts the sensing values according to the calibration table. Since the output value in the calibration table is equal to the corresponding index when the step S1106 is performed for the first time, the adjusted sensing value is the same as the sensing value prior to adjustment.

In step S1108, the recursive module 230 calculates the difference according to the standard values and the adjusted sensing values. Namely, in the second embodiment, each sensing value $i_{n,j}$ in the formula (8) is adjusted by the calibration module 220 according to the calibration table.

In step S1110, the recursive module 230 determines if a recursive condition is satisfied. In the second embodiment, the recursive module 230 determines that the recursive condition is satisfied when the difference is less than the difference threshold or when the recursive number matches the recursive threshold value. If the recursive condition is satisfied, the process shown in FIG. 11 is completed.

However, if the recursive condition is not satisfied, in step S1112, the calibration module 220 generates a temporary calibration table according to the standard values and the adjusted sensing values. When the step S1112 is performed for the first time, since the adjusted sensing value is equal to the sensing value prior to adjustment, the generated temporary calibration table is equal to the calibration table first generated in the first embodiment (as shown in FIG. 5).

In step S1114, the calibration module 220 combines the temporary calibration table with the calibration table and returns to the step S1104. Note that the combined calibration table is the same as the temporary calibration table when the step S1114 is performed for the first time. In particular, the formulas (6) and (7) may be re-written as formulas (9) and (10) below.

$$t = m_{1,j} = j \qquad (9)$$

$$m_{2,j} = g_{1,t} = g_{1,j} \qquad (10)$$

To sum up, according to the color calibration method and the image processing device described herein, the calibration table may be generated in a recursive manner. Hence, the difference between the sensing values and the standard values may be gradually lessened and converged.

It will be apparent to those skilled in the art that various modifications and variations can be made to the structure of the disclosed embodiments without departing from the scope or spirit of the invention. In view of the foregoing, it is intended that the invention covers modifications and variations of this invention provided they fall within the scope of the following claims and their equivalents.

What is claimed is:

1. A color calibration method for an image processing device, the color calibration method comprising:
    obtaining a first image of a calibration card, wherein the calibration card has a plurality of color blocks, and each of the color blocks corresponds to a standard value;
    obtaining a plurality of first sensing values according to the first image, wherein each of the first sensing values corresponds to one of the standard values;
    generating a calibration table according to the first sensing values and the standard values;
    determining if a recursive condition is satisfied, wherein the step of determining if the recursive condition is satisfied comprises:
        calculating a difference according to the first sensing values and the standard values, or calculating the difference according to the third sensing values and the standard values, wherein the step of calculating the difference according to the first sensing values and the standard values comprises:
            calculating a sum of squared error between the first sensing values and the standard values to obtain the difference,
        wherein the step of calculating the difference according to the third sensing values and the standard values comprises:
            calculating a sum of squared error between the third sensing values and the standard values to obtain the difference;
        determining if the difference is less than a difference threshold; and
        determining the recursive condition is satisfied if the difference is less than the difference threshold; and
    obtaining a second image of the calibration card if the recursive condition is not satisfied, obtaining a plurality of second sensing values according to the second image, adjusting the second sensing values according to the calibration table to generate a plurality of third sensing values, and updating the calibration table according to the third sensing values and the standard values until the recursive condition is satisfied.

2. The color calibration method as recited in claim 1, wherein the calibration table comprises a plurality of first output values, each of the first output values corresponds to a first index, and the step of generating the calibration table according to the first sensing values and the standard values comprises:
    setting part of the first indexes as the first sensing values;
    setting the first output values corresponding to the first sensing values as the standard values; and
    generating the first output values not corresponding to the first sensing values.

3. The color calibration method as recited in claim 1, wherein the step of determining if the recursive condition is satisfied comprises:
    determining if a recursive number matches a recursive threshold value; and
    determining the recursive condition is satisfied if the recursive number matches the recursive threshold value,
    wherein the step of generating the calibration table according to the first sensing values and the standard values further comprises:
    updating the recursive number.

4. The color calibration method as recited in claim 2, wherein the first sensing values comprise a minimum sensing value and a maximum sensing value, and the step of generating the first output values not corresponding to the first sensing values comprises:
    setting the first output values corresponding to the first indexes less than the minimum sensing value as a first preset value;
    setting the first output values corresponding to the first indexes greater than the maximum sensing value as a second preset value; and
    generating rest of the first output values through an interpolation algorithm.

5. The color calibration method as recited in claim 2, wherein the first indexes comprise a second index corresponding to a second output value of the first output values, and the step of updating the calibration table according to the third sensing values and the standard values comprises:

establishing a temporary calibration table, wherein the temporary calibration table comprises a plurality of third output values, and each of the third output values corresponds to a third index;

setting part of the third indexes as the third sensing values;

setting the third output values corresponding to the third sensing values as the standard values; and generating the third output values not corresponding to the third sensing values;

taking the second output value as one of the third indexes to obtain a fourth output value from the third output values; and setting the second output value as the fourth output value.

6. An image processing device comprising:

an image capturing unit, configured to obtain a first image of a calibration card, wherein the calibration card comprises a plurality of color blocks, and each of the color blocks corresponds to a standard value; and a processor, coupled to the image capturing unit, configured to obtain a plurality of first sensing values according to the first image, wherein each of the first sensing values corresponding to one of the standard values, wherein the processor is configured to generate a calibration table according to the first sensing values and the standard values and determine if a recursive condition is satisfied, wherein the processor is configured to obtain a second image of the calibration card if the recursive condition is not satisfied, obtain a plurality of second sensing values according to the second image, adjust the second sensing values according to the calibration table to generate a plurality of third sensing values, and update the calibration table according to the third sensing values and the standard values until the recursive condition is satisfied, wherein the processor is configured to calculate a difference according to the first sensing values and the standard values, or calculate the difference according to the third sensing values and the standard values, wherein the processor is configured to determine if the difference is less than a difference threshold, and if the difference is less than the difference threshold, the processor is further configured to determine that the recursive condition is satisfied, wherein the processor is configured to calculate a sum of squared error between the first sensing values and the standard values to obtain the difference, or calculate a sum of squared error between the third sensing values and the standard values to obtain the difference.

7. The image processing device as recited in claim 6, wherein the calibration table comprises a plurality of first output values, and each of the first output values corresponds to a first index, wherein the processor is configured to set part of the first indexes as the first sensing values, set the first output values corresponding to the first sensing values as the standard values, and generate the first output values not corresponding to the first sensing values.

8. The image processing device as recited in claim 6, wherein the processor is further configured to determine if a recursive number matches a recursive threshold value, determine the recursive condition is satisfied if the recursive number matches the recursive threshold value, and update the recursive number when the processor updates the calibration table according to the third sensing values and the standard values.

9. The image processing device as recited in claim 7, wherein the first sensing values comprise a minimum sensing value and a maximum sensing value, and the processor is further configured to set the first output values corresponding to the first indexes less than the minimum sensing value as a first preset value, set first output values corresponding to the first indexes greater than the maximum sensing value as a second preset value, and generate rest of the first output values through an interpolation algorithm.

10. The image processing device as recited in claim 7, wherein the first indexes comprise a second index corresponding to a second output value of the first output values, the processor is further configured to establish a temporary calibration table, the temporary calibration table comprises a plurality of third output values, and each of the third output values corresponds to a third index, wherein the processor is configured to set part of the third indexes as the third sensing values, set the third output values corresponding to the third sensing values as the standard values, generate the third output values not corresponding to the third sensing values, take the second output value as one of the third indexes to obtain a fourth output value from the third output values, and set the second output value as the fourth output value.

* * * * *